United States Patent
Ketharaju (10) Patent No.: US 11,367,356 B1
(45) Date of Patent: Jun. 21, 2022

(54) AUTONOMOUS FLEET SERVICE MANAGEMENT

(71) Applicant: Wells Fargo Bank, N.A., San Francisco, CA (US)

(72) Inventor: Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 82 days.

(21) Appl. No.: 16/820,326

(22) Filed: Mar. 16, 2020

(51) Int. Cl.
*G08G 1/00* (2006.01)
*G06Q 20/38* (2012.01)
(Continued)

(52) U.S. Cl.
CPC ......... *G08G 1/202* (2013.01); *B60W 60/0025* (2020.02); *G06Q 20/204* (2013.01); *G06Q 20/385* (2013.01)

(58) Field of Classification Search
CPC ......... G05D 2201/0213; G05D 1/0088; G05D 1/0212; G05D 1/0027; G05D 1/0276; G05D 1/0297; G05D 2201/0212; G05D 1/0022; G05D 1/0038; G05D 1/0061; G05D 1/021; G05D 1/0214; G05D 1/0221; G05D 1/0285; G05D 23/1917; H04L 67/12; H04L 67/10; H04L 67/18; H04L 43/0864; H04L 43/0876; H04L 67/26; H04L 63/102; H04L 67/04; H04W 4/40; H04W 4/029; H04W 4/024; H04W 12/06; H04W 12/088; H04W 12/68; H04W 36/34; H04W 48/04; H04W 4/02; H04W 4/021; H04W 4/12; H04W 4/21; H04W 4/44; H04W 4/46;
(Continued)

(56) References Cited

U.S. PATENT DOCUMENTS

| 6,856,820 B1 | 2/2005 | Kolls |
| 8,219,490 B2 | 7/2012 | Hammad et al. |

(Continued)

FOREIGN PATENT DOCUMENTS

| CN | 108597128 | 9/2018 |
| CN | 109034780 | 12/2018 |

(Continued)

OTHER PUBLICATIONS

U.S. Appl. No. 17/141,879, filed Jan. 5, 2021, naming inventor Rameshchandra Bhaskar Ketharaju.

(Continued)

*Primary Examiner* — Alexander G Kalinowski
*Assistant Examiner* — Sanjeev Malhotra
(74) *Attorney, Agent, or Firm* — Shumaker & Sieffert, P.A.

(57) ABSTRACT

Techniques discussed herein describe an example system for managing a fleet of vehicles. A server determines whether to provision a service for a vehicle based on telemetry data received from a telemetry module on the vehicle in a fleet of vehicles. The telemetry data includes a first location and status information of the vehicle. The server identifies a vendor to provide the service and directs the vehicle to a second location of the vendor from the first location of the vehicle. The server provides authorization to the vehicle for an on-board transaction module to initiate a request for the service when the vehicle is at the second location of the vendor.

15 Claims, 6 Drawing Sheets

(51) Int. Cl.
*B60W 60/00* (2020.01)
*G06Q 20/20* (2012.01)

(58) Field of Classification Search
CPC ........... H04W 4/48; H04W 4/60; H04W 4/70; H04W 4/80; H04W 64/00; H04W 64/006; H04W 76/11; H04W 84/005; G06Q 50/30; G06Q 10/02; G06Q 10/00; G06Q 30/012; G06Q 30/0266; G06Q 30/0645; G06Q 10/06315; G06Q 10/20; G06Q 20/127; G06Q 20/40; G06Q 30/00; G06Q 30/0265; G06Q 30/06; G06Q 30/0633; G06Q 30/0639; G06Q 30/0641; G06Q 50/28; G01C 21/3438; G01C 21/3691; G01C 21/3697; G01C 21/3415; G01C 21/343; G01C 21/3461; G01C 21/3484; G01C 21/3492; G01C 21/20; G01C 21/26; G01C 21/3407; G01C 21/3605; G06N 20/00; G08G 1/096741; G08G 1/096775; G08G 1/096844; G08G 1/096725; G08G 1/096811; G08G 1/164; G08G 1/202; G08G 1/0112; G08G 1/0116; G08G 1/0133; G08G 1/0141; G08G 1/0968; G08G 1/096838; G08G 1/096861; G08G 1/096872; G08G 1/096883; G08G 1/205; B60R 25/25; B60R 11/04; B60R 2325/205; B60R 25/00; B60R 25/1004; B60R 25/102; B60R 25/241; B60W 60/001; B60W 2554/00; B60W 2556/65; B60W 30/09; G01S 19/13; G01S 19/42; G01S 19/48; G06F 3/017; G06F 16/25; G06F 16/29; G06F 16/583; G06F 16/951; G06F 21/00; G06F 21/31; G06F 21/32; G06F 3/0482; G06F 3/0488; G07C 5/008; G07C 5/08; G07C 5/0808; G07C 9/00563; G07C 5/02; G07C 9/00571; B60K 35/00; B60Q 1/52; G06K 2009/00939; G06K 9/00255; G06K 9/00268; G06K 9/00355; G06K 9/00791; G06K 9/00832; G08B 13/19647; G08B 21/06; G08B 25/016; G08B 29/188; H04N 7/181; H04N 21/41422
USPC .............. 701/1, 29.3, 416; 705/13; 340/5.61, 340/870.07, 995.23; 342/357.31; 455/456.1
See application file for complete search history.

(56) References Cited

U.S. PATENT DOCUMENTS

| | | | | |
|---|---|---|---|---|
| 2004/0049337 | A1* | 3/2004 | Knockeart | G08G 1/096838 340/995.23 |
| 2004/0104842 | A1* | 6/2004 | Drury | G08G 1/096827 342/357.31 |
| 2007/0155406 | A1* | 7/2007 | Dowling | H04L 67/16 455/456.1 |
| 2011/0102189 | A1* | 5/2011 | Murray | B60R 25/04 340/870.07 |
| 2013/0018705 | A1 | 1/2013 | Heath et al. | |
| 2014/0309806 | A1* | 10/2014 | Ricci | G06Q 10/20 701/1 |
| 2015/0363986 | A1* | 12/2015 | Hoyos | H04L 63/0861 340/5.61 |
| 2016/0086391 | A1* | 3/2016 | Ricci | G06Q 30/06 701/29.3 |
| 2016/0203649 | A1* | 7/2016 | Berkobin | G06Q 30/0609 705/13 |
| 2016/0239903 | A1* | 8/2016 | Othmer | H04W 4/029 |
| 2016/0302046 | A1* | 10/2016 | Velusamy | G08G 1/0141 |
| 2017/0067747 | A1* | 3/2017 | Ricci | G05D 1/0016 |
| 2017/0212511 | A1 | 7/2017 | Ferreira et al. | |
| 2017/0337813 | A1* | 11/2017 | Taylor | G05D 1/0285 |
| 2018/0144322 | A1 | 5/2018 | Unnerstall | |
| 2018/0268418 | A1* | 9/2018 | Tanksali | G06Q 30/012 |
| 2019/0043135 | A1 | 2/2019 | Kawamoto et al. | |
| 2019/0312815 | A1* | 10/2019 | Altman | H04L 43/0876 |
| 2020/0041994 | A1* | 2/2020 | Alalao | H04W 4/18 |
| 2020/0042019 | A1* | 2/2020 | Marczuk | G08G 1/205 |
| 2020/0043574 | A1* | 2/2020 | Mehrotra | G06Q 30/0185 |
| 2020/0050198 | A1* | 2/2020 | Donnelly | G01C 21/343 |
| 2020/0051194 | A1* | 2/2020 | Park | G06F 3/0482 |
| 2020/0145191 | A1 | 5/2020 | Qi et al. | |
| 2020/0151661 | A1 | 5/2020 | Mezaael | |
| 2020/0193826 | A1* | 6/2020 | Dozono | G06Q 20/127 |
| 2020/0209002 | A1* | 7/2020 | Hou | G07C 5/008 |
| 2020/0209845 | A1* | 7/2020 | Chen | G05D 1/0038 |
| 2020/0241869 | A1* | 7/2020 | Niemiec | G06F 8/65 |
| 2020/0259885 | A1* | 8/2020 | Alam | G06F 9/5027 |
| 2020/0344470 | A1* | 10/2020 | Shen | G05D 1/0246 |
| 2020/0344622 | A1* | 10/2020 | Campbell, Jr. | H04W 4/40 |
| 2020/0363807 | A1* | 11/2020 | Haque | G05D 1/0212 |
| 2020/0364953 | A1* | 11/2020 | Simoudis | G06N 5/022 |
| 2020/0379079 | A1* | 12/2020 | Dupray | H04W 64/00 |
| 2020/0401162 | A1* | 12/2020 | Lisewski | H04L 9/3213 |
| 2020/0409369 | A1* | 12/2020 | Zaytsev | G05D 1/0088 |
| 2021/0016772 | A1* | 1/2021 | Golov | G06V 20/584 |
| 2021/0046897 | A1* | 2/2021 | Ferguson | G07C 9/00896 |
| 2021/0082291 | A1* | 3/2021 | Villa | B64C 39/024 |
| 2021/0182454 | A1* | 6/2021 | Smaili | G07C 5/0808 |
| 2021/0191402 | A1* | 6/2021 | Zhu | B60R 16/0231 |
| 2021/0201357 | A1* | 7/2021 | Singhal | G01S 13/867 |

FOREIGN PATENT DOCUMENTS

IN 201841011516 2/2019
WO 2017122976 7/2017

OTHER PUBLICATIONS

Khoshnoud, F., "It's not hype: Blockchain could revolutionize fleet management and mobility services." Retrieved from https://insights.conduent.com/conduent-blog/it-s-not-hype-blockchain-could-revolutionize-fleet-management-and-mobility-services, Feb. 13, 2019, 3 pages.

"How blockchain can benefit fleet management and trucking," Retrieved from https://www.wexinc.com/insights/blog/efs-fleet/blockchain-benefil-fleet-management/, Jan. 24, 2019, 7 pages.

Leiding, B., et al., "Enabling the Vehicle Economy Using a Blockchain-Based Value Transaction Layer Protocol for Vehicular Ad-Hoc Networks", May 28, 2018, 28 pages.

Williams, R. "BMW pilots in-car food ordering with delivery app Olo'" Mobile Marketer. Retrieved from https://www.mobilemarketer.com/news/bmw-pilots-in-car-food-ordering-with-delivery-app-olo/567958/, Nov. 25, 2019, 2 pages.

Dannemman, T., "When your car can see more than you can" retrieved from https://www.qualcomm.com/news/onq/2020/04/23/when-your-car-can-see-more-you-can, Apr. 23, 2020, 4 pages.

"Core System Requirements Specification (SyRS)", U.S. Department of Transportation's Core retrieved from www.its.dot.gov/meetings/pdf/CoreSystem_SE_SyRS_RevA%20(Jun. 13, 2011).pdf, Jun. 13, 2011, 131 pages.

\* cited by examiner

AUTONOMOUS FLEET SERVICE MANAGEMENT

TECHNICAL FIELD

This disclosure relates to computer-based service transactions for fleets of vehicles.

BACKGROUND

Companies, such as transportation companies and logistics companies, often have fleets of vehicles to provide goods and services relevant to the business. From time-to-time, these vehicles need services to remain operative. The company is typically responsible for managing the facilitation of and/or payment for those services.

SUMMARY

In general, this disclosure describes techniques to enable transportation companies that own large fleets of vehicles, which may be autonomous, semi-autonomous, or regular, non-autonomous vehicles, to manage vehicle operation and fleet maintenance, and machine-to-machine (M2M) transactions for vehicle operation and maintenance. A fleet management system may include a transaction management server of the transportation company and diagnostic and transaction modules within each of the vehicles. The fleet management system uses these vehicle-based modules to track and monitor each of the vehicles and, if the respective vehicle is in need of a service, assess nearby service outlets. The fleet management server may direct the vehicle to a selected service outlet. After arriving at the selected service outlet, the vehicle requests the identified service from the service vendor. In some examples, the service outlet may request that the fleet management system verify and/or authorized the request. The fleet management system may then verify and validate the request for the service and send approval to the vehicle on-board transaction module for a transaction with one of the service outlets. The on-board transaction module may initiate the transaction with a point-of-sale (POS) device at the service outlet. The POS device may complete the payment transaction with either the transaction management server of the transportation company or with the on-board transaction module of the vehicle.

An example method includes determining to provision a service for a vehicle based on telemetry data received from a telemetry module on the vehicle in a fleet of vehicles. The telemetry data includes a first location and status information the vehicle. The method also includes identifying a vendor to provide the service and directing the vehicle to a second location of the vendor from the first location of the vehicle. Additionally, the method includes providing authorization to the vehicle for an on-board transaction module to initiate a request for the service when the vehicle is at the second location of the vendor.

An example system includes a fleet management server and a telemetry application to execute on a telemetry module of a vehicle to collect telemetry data from sensors of the vehicle. The fleet management server determines to provision a service for a vehicle based on the telemetry data received from the telemetry module. The telemetry data includes a first location and status information the vehicle. The fleet management server identifies a vendor to provide the service and directs the vehicle to a second location of the vendor from the first location of the vehicle. The fleet management server provides authorization to the vehicle for an on-board transaction module to initiate a request for the service when the vehicle is at the second location of the vendor.

An example non-transitory computer readable medium comprises instructions that, when executed, cause a fleet management server to determine to provision a service for a vehicle based on telemetry data received from a telemetry module on the vehicle in a fleet of vehicles. The telemetry data includes a first location and status information the vehicle. The instructions also cause the fleet management server to identify a vendor to provide the service and direct the vehicle to a second location of the vendor from the first location of the vehicle. Additionally, the instructions also cause the fleet management server to providing authorization to the vehicle for an on-board transaction module to initiate a request for the service when the vehicle is at the second location of the vendor.

The details of one or more examples are set forth in the accompanying drawings and the description below. Other features, objects, and advantages will be apparent from the description and drawings, and from the claims.

DETAILED DESCRIPTION

Transportation companies own and/or manage large fleets of vehicles, such as autonomous, semi-autonomous, and/or standard vehicles. From time-to-time, these fleet vehicles need maintenance. However, monitoring the vehicle and provisioning maintenance can be challenging, especially for larger fleets. Additionally, it may be difficult to manage transactions for vehicle operation and maintenance. As described below, a computing system (e.g., one or more servers, etc.) operates a vehicle monitoring system and a transaction management gateway. The vehicle monitoring system communicates with wireless communication modules (sometimes referred to as "on-board communication platforms") of vehicles having telemetry modules that collect operational data from sensors within the vehicle. Based on the operational data, the vehicle monitoring system, upon determining that a vehicle requires a service and/or maintenance, selects a vendor to provide the service and directs the vehicle to the location of the vendor. The services and/or maintenance may include, for example, refueling, paying a toll, parking, system repair, tire rotation, oil change, etc. For example, if the operational data indicates that the fuel tank is below a threshold amount of fuel, the vehicle monitoring system may direct the vehicle to a service station within a current operational range of the vehicle. In some examples, the telemetry module of the vehicle includes a diagnostic system. In such examples, the vehicle may provide the location of the vehicle and request service to the vehicle monitoring system, which then directs the vehicle to an appropriate vendor.

At the vendor, an on-board transaction module of the vehicle initiates a transaction with a point-of-sale (PoS) device (e.g., via the on-board communication module of the vehicle). The PoS device then completes the transaction. In some examples, the PoS device completes the transaction with the transaction management gateway of the fleet management server. In such examples, the PoS device uses one or more identifiers (e.g., a fleet management server identifier and/or a vehicle identifier, etc.) to contact the transaction management gateway to complete the transaction. Alternatively, in some examples, the PoS device completes the transaction with the on-board transaction module of the vehicle. In such examples, the on-board transaction module includes transaction card information or a digital wallet information capable of making the transaction upon identification and authentication by the fleet management system. In some examples, the on-board transaction module receives a onetime use token from the transaction management gateway to use to initiate the transaction. In some such examples, the on-board transaction module may receive an authorization code from the transaction management gateway of the fleet management server to be used by the PoS device to check the authenticity of the transaction or the PoS device may directly request authorization from the fleet management server. Once a transaction is authorized, the PoS device may initiate the transaction with a transaction system to transfer funds from a fleet manager financial account to a vendor financial account. As described below, an on-board transaction module communicatively coupled to a fleet management server provides technological means to for securely provisioning services to a vehicle in a fleet of vehicles.

Figure 1:
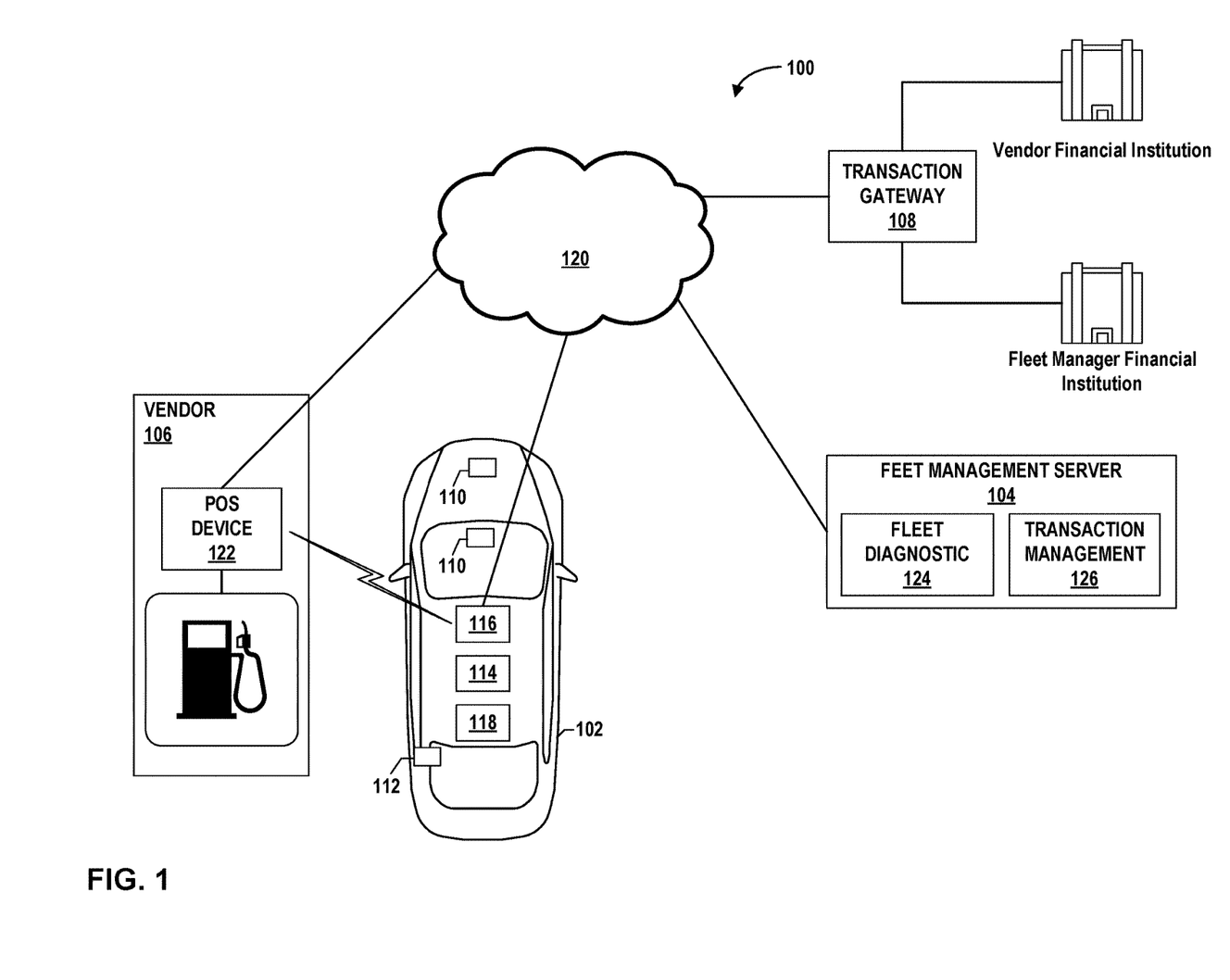
FIG. 1 illustrates a system including a vehicle and a fleet management server operating in accordance with the teachings of this disclosure.

FIG. 1 illustrates a system 100 including a vehicle 102 and a fleet management server 104 operating in accordance with the teachings of this disclosure. While in the illustrated example, a single vehicle is illustrated, the fleet management server 104 may manage multiple vehicles as described below. In the illustrated example, the vehicle 102 and the fleet management server 104 coordinate to provision services and/or maintenance to the vehicle 102. Specifically, the vehicle 102 and/or the fleet management server 104 determine that a service (e.g., a toll, a paid parking, etc.) or maintenance (e.g., an oil change, a part repair, etc.) is necessary. The fleet management server 104 directs the vehicle 102 to a vendor 106 to receive the service and/or maintenance. As described below, the vehicle 102 initiates a transaction with the vendor 106. The fleet management server 104 authorizes the transaction. The vendor 106 submits the transaction to a transaction gateway 108 to process a transaction from the financial institution of the fleet management server 104 to the financial institution of the vendor 106. The transaction gateway 108 may, for example, include a portal that routes transactions to credit card processors.

The vehicle 102 may be a standard gasoline powered vehicle, a hybrid vehicle, an electric vehicle, a fuel cell vehicle, and/or any other mobility implement type of vehicle (e.g., boats, planes, drones, etc.). The vehicle 102 includes parts related to mobility, such as a powertrain with an engine, a transmission, a suspension, a driveshaft, and/or wheels, etc. The vehicle 102 may be non-autonomous, semi-autonomous (e.g., some routine motive functions controlled by the vehicle 104), or autonomous (e.g., motive functions are controlled by the vehicle 104 without direct driver input). In some examples, the vehicle 102 is part of a fleet of vehicles. In the illustrated example, the vehicle 102 includes sensors 110, electronic control units (ECUs) 112, a telemetry module 114, an on-board communications platform 116, and an on-board transaction module 118.

The sensors 110 may be arranged in and around the vehicle 102 in any suitable fashion. The sensors 110 may include camera(s), sonar, RADAR, LiDAR, ultrasonic sensors, optical sensors, or infrared devices configured to measure properties around the exterior of the vehicle 102. Additionally, some sensors 110 may be mounted inside the passenger compartment of the vehicle 102 or in the body of the vehicle 102 (such as, the engine compartment, the wheel wells, etc.) to measure properties in the interior of the vehicle 102. For example, such sensors 110 may include accelerometers, odometers, pitch and yaw sensors, wheel speed sensors, cameras, microphones, and thermistors, tire pressure sensors (e.g., TMPS systems), biometric sensors, etc. The sensors 110 provide information that can be used to determine the status of the vehicle 102.

The ECUs 112 are hardware modules monitor and/or control a function or a group of functions on the vehicle 102. The ECUs 112 may cooperate by transmitting data (e.g., sensor data, control signals, status information, etc.) over one or more vehicle data buses (e.g., the data bus 202 of FIG. 2 below). The ECUs 112 may incorporate and/or be communicatively coupled to one or more of the sensors 110. The ECUs 112 may include, for example, a steering control unit that controls and monitors the power steering system of the vehicle 102, a braking control unit that controls and monitors an anti-lock braking system, a transmission control module that controls transmission functions and shifting based on a transmission fluid temperature sensor, a brake pedal position sensor, a throttle position sensor, and/or an engine control module that manage an air fuel mixture and emission control systems of the vehicle 102 based off input from the sensors 110 in the engine compartment, etc. The ECUs 112 are discrete sets of electronics that include their own circuit(s) (such as integrated circuits, microprocessors, memory, storage, etc.) and firmware, sensors, actuators, and/or mounting hardware.

The telemetry module 114 compiles information about the vehicle 102 and/or driver performance by collecting data from sensors 110 and/or ECUs 112 within the vehicle 102. For example, the telemetry module 114 may collect data related to vehicle emissions via a catalytic converter sensor, piston misfiring via a crankshaft position sensor, fuel mixture monitoring via the engine control module, etc. In some examples, the telemetry module 114 collects diagnostic information from ECUs 112 in a diagnostic mode when the diagnostic mode is available. The telemetry module 114 may compile raw data to be transmitted to the fleet management server 104. Alternatively or additionally, in some examples, the telemetry module 114 performs some data processing (e.g., sorting, aggregation, filtering, validating, etc.) before the data is transmitted. In some such examples, the fleet manger 104 may provide a profile and/or a script to specify the manner that the data is to be collected and/or processed. In some examples, the telemetry module 114 includes one or more diagnostic thresholds that, when satisfied, indicate that a system of the vehicle 102 requires service. In such example, the telemetry module 114 requests a service from the fleet management server 104.

The on-board communications platform 116 includes wireless network interfaces to enable communication with an external network 120. The on-board communications platform 116 facilitates communication between the vehicle 102 and the fleet management server 104 and/or communication between the vehicle 102 and a point-of-sale (POS) device 122 of the vendor 106. In some examples, the on-board communication module 116 operates as a switch between the fleet management server 104 and the POS device 122 of the vendor 106 selected to provide a service to the vehicle 102. The on-board communications platform 116 also includes hardware (e.g., processors, memory, storage, etc.) and software to control the wireless network interfaces. The external network 120 may be a collection of one or more networks, including standards-based networks (e.g., local area wireless networks (including IEEE 802.11 a/b/g/n/ac or others), personal area networks (including Bluetooth®, Bluetooth® Low Energy, Zigbee®, Z-wave®, near field communication (NFC), etc.), and/or wide area networks (e.g., GSM®, Long Term Evolution (LTE)™; WiMAX (IEEE 802.16), WiGig (IEEE 802.11ad/ay, etc.), ultra-wideband communication (5G), etc.)). For example, the on-board communications platform 116 may include an electronic subscriber identification module (eSIM) to support communicating via one or more cellular networks. In some examples, the on-board communications platform 116 includes a global positioning system (GPS) receiver (or any other satellite-based location system) to determine the location of the vehicle 102 to, for example, facilitate navigating to a vendor 106 specified by the fleer manager 104. In the illustrated example, the telemetry module 114 is separate from the on-board communications platform 116. However, in some examples, the telemetry module 114 may be incorporated into the on-board communications platform 116. In some examples, the telemetry module 114 and/or the on-board communications platform 116 may be referred to as an "Internet-of-Things (IoT) machine" (e.g., when the telemetry module 114 and/or the on-board communications platform 116 are a third party device installed after the vehicle 102 is manufactured, etc.).

In some examples, the on-board communication platform 116 may include a dedicated short range communication (DSRC) module that includes hardware, antenna(s), radio(s) and software to broadcast messages and to establish connections between the vehicles (sometimes referred to as "vehicle-to-vehicle communication", infrastructure-based modules (sometimes referred to as "vehicle-to-infrastructure communication"), and mobile device-based modules (sometimes referred to as "vehicle-to-mobile communication") (collectively referred to as "V2X communication"). The example DSRC module may, for example, implement the DSRC protocol as specified by the U.S. Department of Transportation's Core June 2011 System Requirements Specification (SyRS) report (available at www.its.dot.gov/meetings/pdf/CoreSystem_SE_SyRS_RevA %20(2011-06-13).pdf)). However, the DSRC module may implement communication protocols used to communicatively couple vehicles, roadside nodes, and/or mobile devices and may be implemented by one of the standards-based networks described above.

The on-board transaction module 118 facilitates ordering and paying (e.g., via the on-board communications platform 116) for goods and/or services requested by the vehicle 102. On-board transaction module 118 initiates a transaction with the POS device 122 at the vendor 106. The on-board transaction module 118 may, for example, communicate with the POS device 122 using one of the standard-based networks, such as 5G or Bluetooth®. The POS device 122 may then complete the transaction (a) directly with the fleet management server 104 (e.g., via the network 120), (b) with the fleet management server 104 via the on-board transaction module 118, or (c) directly with the on-board transaction module 118. The POS device 112 may contact the fleet management server 104 to complete the transaction based one an identifier in the communication from the on-board transaction module 118 identifying the vehicle 102 and/or the fleet management server 104. In some examples, the on-board transaction module 118 includes transaction account information or a digital wallet capable of making the transaction upon identification and authentication by the fleet management 104 via the on-board communication module 116. In some examples, the transaction account information or a digital wallet are cryptographically locked until, as part of the authorization by the fleet management server 114, a digital key is received that provides access to the transaction account information and/or digital wallet. In some examples, when the vehicle 102 cannot communicate with the fleet management server 104 (e.g., a network connectivity issue, etc.), the on-board transaction module 118 includes a backup transaction method that may have limited pre-authorized funds available. In some such examples, the on-board transaction module 118 initiates a transaction using the back-up transaction method after receiving credentials (e.g., a password, biometric token, etc.) from a user (e.g., the driver) via an interface (e.g., a central console display, an infotainment head unit, etc.).

In some examples, the on-board communications platform 116, communicates with roadside communication modules that coordinate traffic flow in a geographic area. For example, the roadside communication modules may be coupled to infrastructure and a transportation grid management system to provide priority access to, for example, express lanes. In some examples, the fleet management server 114 may be communicatively coupled to the transportation grid management system. The fleet management server 114 may negotiate with transportation grid management system to provide priority for express way usage. For example, the transportation grid management system may engage in a bidding process with fleet management servers 114 and/or vehicles 102 that indicate that the vehicle 102 requests priority access to a particular portion of express lanes of the freeway due to, for example, changing logistical needs and/or changing traffic patterns. In some examples, transactions for priority access are handled by the on-board transaction module 118 at the time that the priory access is provided (e.g., when the corresponding vehicle 102 enters the priority access lane, etc.).

The fleet management server 104 uses the respective telemetry modules 114 and the on-board communication platforms 116 to track and monitor each of the vehicles 102 in a fleet of vehicles and, if the respective vehicle 102 needs a service (e.g., refueling, an oil change, tire rotation, engine repair, etc.), selects (e.g., from a list of authorized vendors) a nearby vendor 106. The fleet management server 104 includes one or more servers communicatively coupled to the network 120 In the illustrated example, the fleet management server 104 includes a fleet diagnostic module 124 and a transaction manager 126.

The fleet diagnostic module 124 tracks and monitors the status of a fleet of vehicles. In some example, the fleet diagnosis module 124 provides an interface for a user to interact with the tracking and monitoring data. The fleet diagnostic module 124 receives the status data compiled by the telemetry modules 114 of the vehicles 102 in the fleet of vehicles being managed by the fleet management server 104. The fleet diagnostic module 124 analyzes the status data for each of the vehicles 102 to determine whether a vehicle 102 requires a service or maintenance. In some examples, the fleet diagnostic module 124 compares the status data to rules that define events that indicate that a good or service is required. For example, the status data may include tire pressure readings from the vehicle 102. In such examples, the fleet diagnostic module 124 may determine that the vehicle 102 requires tire maintenance when the tire pressure of a tire is below a tire pressure threshold. As another example, the fleet diagnostic module 124 may monitor the status information to determine whether the vehicle 102 is compliant with vehicle emission standards. Alternatively or additionally, in some examples, the fleet diagnostic module 124 receives requests from a vehicle 102 that indicates that a good or service is needed. For example, the vehicle 102 may request a fueling stop or indicate that a toll is forthcoming. When a good or service is required, the fleet diagnostic module 124 selects a vendor 106 to provide the service based on, for example, the location of the requesting vehicle 102 and/or a relationship with the vendor 106. The fleet diagnostic module 124 provides the location of the vendor 106 to the requesting vehicle 102 to cause the vehicle 102 to navigate to the vendor 106. In some examples, providing the location of vendor 106 may cause the vehicle 102 to autonomously navigate to the vendor 106. In some examples, providing the location of vendor 106 may cause the location to appear on a navigation system of the vehicle 102 to guide a driver to the vendor 102.

The transaction manager 126 authorizes transaction for services and/or completes transaction transactions with the POS device 122 of the vendor 106. In some examples, the transaction manager 126 provides account information necessary to complete the transaction via the external network 120. Alternatively, the transaction manager 126 provides the information necessary to complete the transaction via the vehicle 102. In some examples, the transaction manager 126 manages transaction information stored by the on-board transaction module 118 by, for example, providing and/or revoking transaction information stored by the on-board transaction module. For example, after the fleet diagnostic module 124 directs the vehicle 102 to the vendor 106, the transaction manager 126 may provide a limited use token to the vehicle 102 to facilitate the on-board transaction module 118 paying for that particular transaction. In some examples, when an on-board transaction module 118 initiates a transaction, the vendor 106 may request authorization from the transaction manager 126. In some examples, the transaction manager 126 is communicatively coupled to a transaction system 128 to authorize, monitor, and/or manage transactions related to the fleet of vehicles. In such a manner, the transaction manager 126 may control expenses of a fleet of vehicles according to the setting made by a user. In some examples, the transaction manager 126 may provide preauthorization to the on-board transaction module 118 to enable the on-board transaction module 118 to perform a transaction with the POS device 122. For example, the transaction management module 126 may provide a digital key (e.g., a hash value, a password, a single use token, etc.) that unlocks account information stored (e.g., stored cryptographically, etc.) in the on-board transaction module 118. In some such examples, the digital key may only be valid for a limited amount of time (e.g., using a time-based one-time password algorithm, etc.) and/or may only unlock the account information for a limited time.

Figure 2:
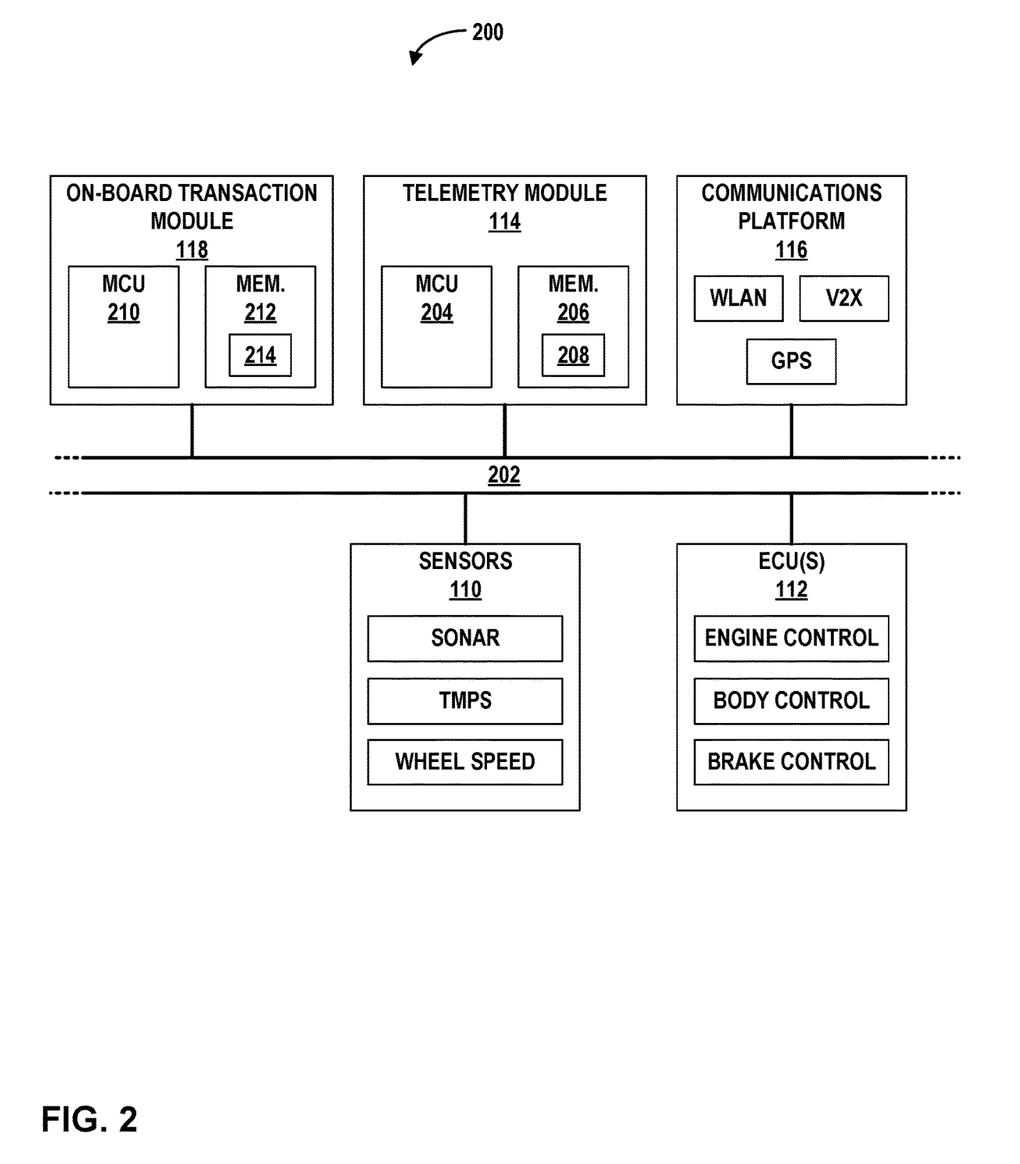
FIG. 2 is a block diagram of the electronic components of the vehicle of FIG. 1.

FIG. 2 is a block diagram of the electronic components 200 of the vehicle 102 of FIG. 1. In the illustrated example, the electronic components 200 include the sensors 110, the ECUs 112, the telemetry module 114, the on-board communications platform 116, the on-board transaction module 118, and a vehicle data bus 202. In the illustrated example, the telemetry module 114, the on-board communications platform 116, and the on-board transaction module 118 are separate electronic components (e.g., systems-on-a-chip (SoCs), integrated circuits, electronic control units, controllers, etc.). However, in some examples, the telemetry module 114, the on-board communications platform 116, and the on-board transaction module 118 may be rearrange and/or combined, etc.

In the illustrated example, the telemetry module 114 includes a processor 204 and memory 206. In the illustrated example, the memory 206 stores telemetry firmware 208, which when executed by the processor 204, causes the telemetry module 114 to collect diagnostic information from the sensors 110 and/or the ECUs 112. The diagnostic information includes, for example, information relating to the status and condition of the vehicle 102 over time (e.g., speed, location, engine temperature, piston timing, fuel level, tire pressure, fluid levels, accelerometer data, etc.). In some examples, the telemetry firmware 208 compiles the diagnostic information and compares it to thresholds to determine when the vehicle 102 requires a service. In some such examples, the telemetry firmware 208 executes one or more scripts provided by the fleet management server 104 that detect one or more issues that require service. Additionally, in some such examples, in addition to or in place of transmitting the diagnostic information to the fleet diagnosis module 124, the telemetry module 114 may send a service request to the fleet diagnostic module 124 that specifies which service the vehicle 102 requires.

In the illustrated example, the on-board transaction module 118 includes a processor 210 and memory 212. In the illustrated example, the memory 212 stores transaction firmware 214, which when executed by the processor 210, causes the on-board transaction module 118 to initiate transactions with the vendor 106. In some examples, the transaction firmware 214 includes a unique identifier that is associated, by the POS device 122 and/or the transaction gateway 108 with the fleet management server 104 to facilitate requesting account information (e.g., credit card information, debit card information, etc.) from the transaction management module 126 of the fleet management server 104. In some examples, the transaction firmware 214 may include the account information and/or one or more single use tokens to provide to the POS device 122 to the vendor 106 to facilitate a transaction.

The processors 204 and 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 206 and 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 206 and 212 includes multiple kinds of memory, particularly volatile memory and non-volatile memory.

The memory 206 and 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 206 and 212, the computer readable medium, and/or within the processor 204 and 210 during execution of the instructions.

The vehicle data bus 202 communicatively couples the sensors 110, the ECUs 112, the telemetry module 114, the on-board communications platform 116, the on-board transaction module 118. In some examples, the vehicle data bus 202 includes one or more data buses. For example, a first data bus may couple the sensors 110 and ECUs 112 to the telemetry module 114 and a second separate data bus that is encrypted may communicatively couple the con-board transaction module 118 to the on-board communication platform 116. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
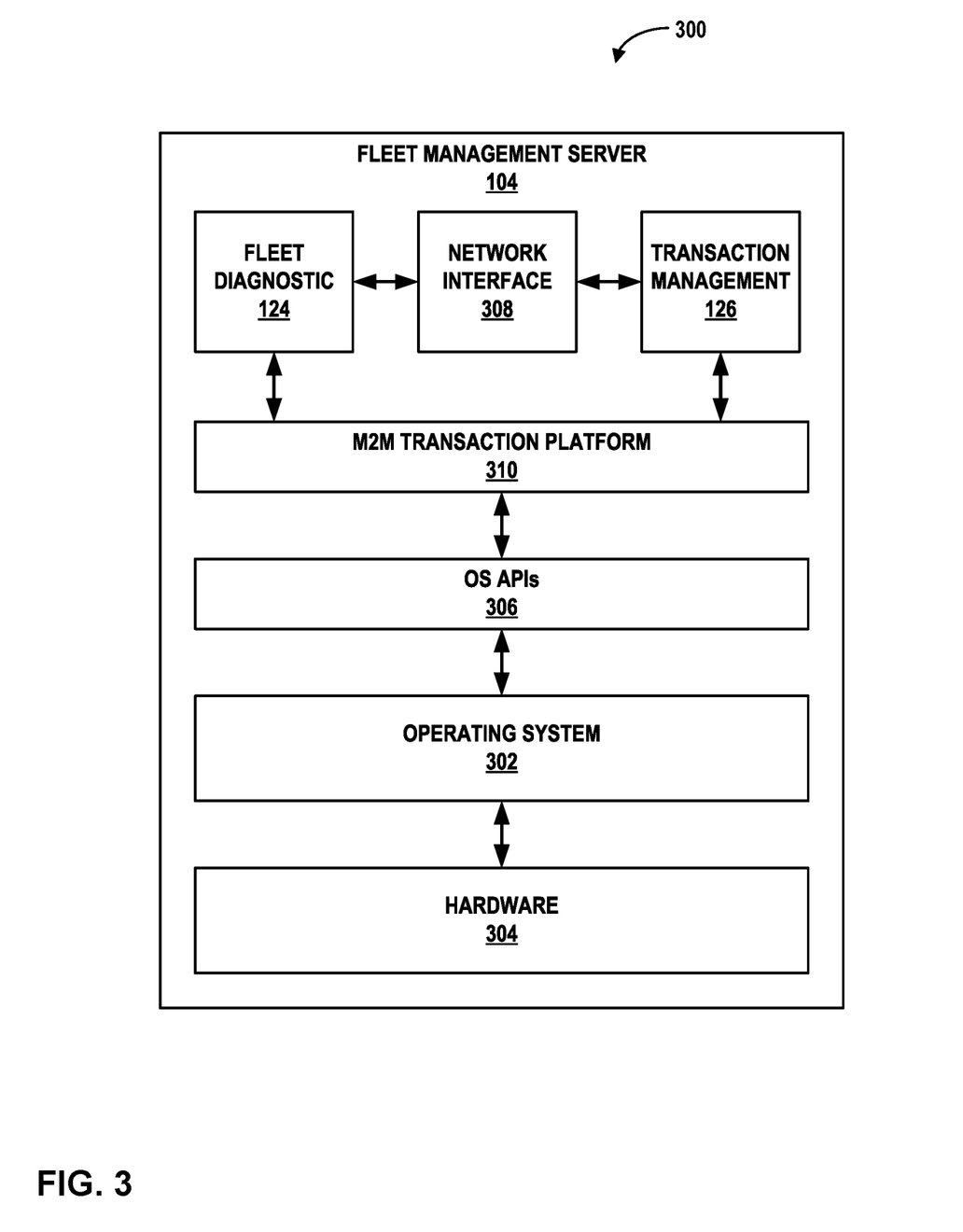
FIG. 3 is a block diagram of the electronic components of the fleet management server of FIG. 1 in further detail.

FIG. 3 is a block diagram of example electronic components 300 of the fleet management server 104. In the illustrated example, the electronic components 300 includes a device operating system 302 for controlling device hardware resources 304 (e.g., processor(s), memory, network interfaces, etc.) and managing various system level operations, operating system APIs 306 used as interfaces between operating system 302, and a network interface 308 to communicate with the on-board communications platforms 116 of the vehicles 102 in the fleet of vehicles via the network 120. Additionally, in the illustrated example, the fleet management server 104 includes a machine-to-machine (M2M) transaction platform 310. The M2M transaction platform 310 autonomously coordinates transactions within the fleet of vehicles. In some examples, the M2M transaction platform 310 using historical service transaction data for previous months and/or available funds in an associated account, autonomously determines and manages a transaction budget. In such examples, the M2M transaction platform 310 monitors fleet-wide maintenance to ensure that the costs of feet-wide maintenance stay within the budget. The M2M transaction platform 310 may prioritize service requests (e.g., from the fleet diagnostic module 124, from the vehicles 102 in the fleet of vehicles, etc.). For example, the M2M transaction platform 310 may deny or delay providing authorization for maintenance (e.g., via the fleet diagnostic module 124). The M2M transaction platform 310 prioritizes servers based on, for example, severity of the service required, the logistical effect of the granting/denying the service request, cost of the service, a predicted future cost due to delaying maintenance, average time to perform the service, and/or availability of vendors 106. This prioritization may also be based on an overall health of the fleet of vehicles, a projected future maintenance requirements of the vehicles (e.g., based on historical data), and a remaining budget. Additionally, in some examples, the M2M transaction platform 310 may autonomously manage a list of vendor 106 that are approved to provide services. The M2M transaction platform 310 may evaluate vendors 106 based on quality metrics and/or timeliness metrics. For example, the M2M transaction platform 310 may track and analyze, on a fleet-wide basis, services provided by a vendor 106 to evaluate cost and service times. For example, the M2M transaction platform 310 may track how frequently vehicles 106 require a service after receiving the service from one of the vendors 106.

The fleet management server 104 may be implemented, for example, by one or more physical and/or virtual servers (e.g., virtual machines, containers, etc.). As described above, the fleet diagnostic module 124 tracks and monitors the status of one or more fleets of vehicles to determine and/or authorize service for the vehicles (e.g., the vehicle 102). Additionally, as described above, the transaction manager 126 authorizes transactions for services and/or completes transactions with the POS device 122 of the vendor 106.

Figure 4:
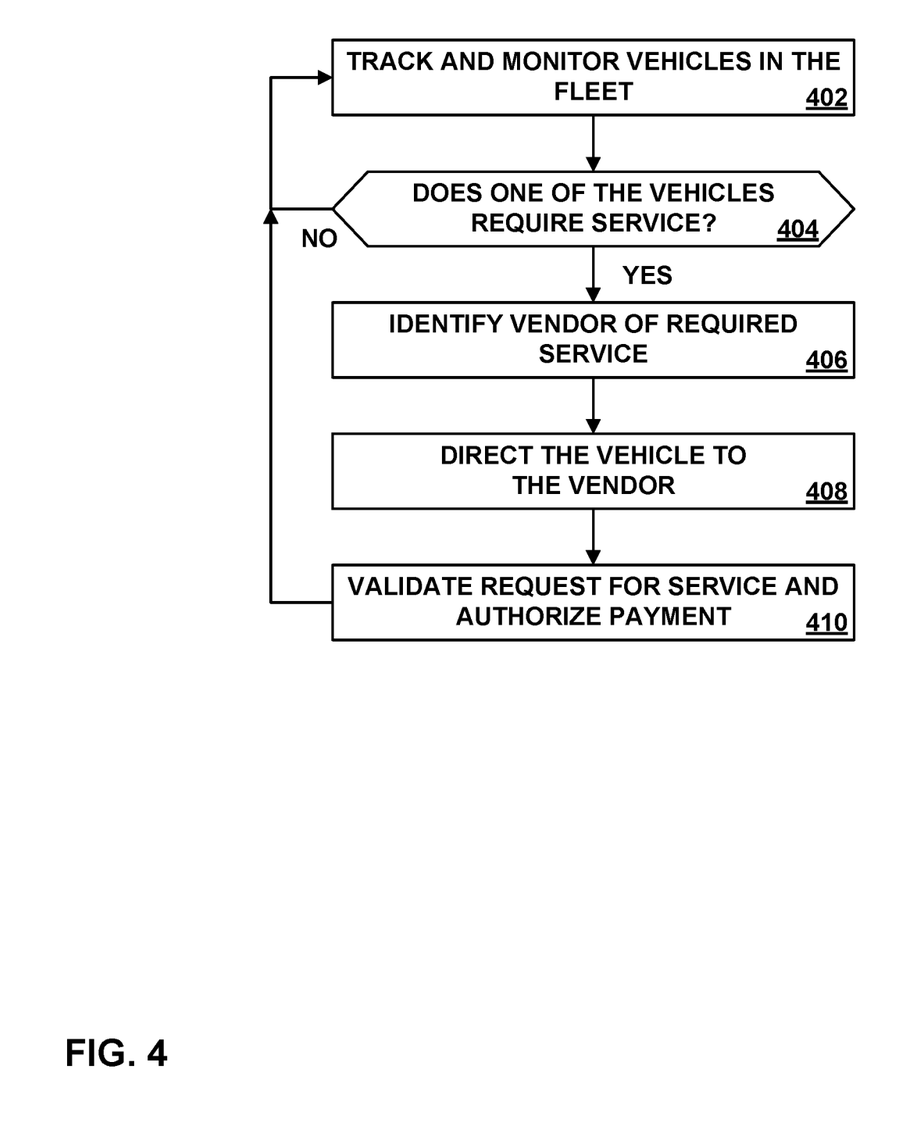
FIG. 4 is a flowchart of an example method to manage a fleet of vehicles.

FIG. 4 is a flowchart of an example method to autonomously manage a fleet of vehicles. Initially, the fleet management server 104 concurrently tracks and monitors the vehicles (e.g., the vehicle 102) in the fleet of vehicles (402) using vehicle diagnostic information and GPS coordinates (sometimes collectively referred to as "telemetry data") received from the vehicles 102 via the network interface 308. The fleet management server 104 may frequently receive telemetry data from multiple vehicles within the fleet. In some examples, to monitor the vehicles 102, the fleet management server 104 periodically (e.g., hourly, daily, etc.) or aperiodically (e.g., in response to an event, etc.), applies the telemetry data received from the vehicles 102 in the fleet of vehicles to rules and/or policies that specify when a vehicle requires one or more services. The fleet management server 104 autonomously determines, without interaction of a user, whether a vehicle 102 in the fleet requires a service (404). In some examples, the fleet management server 104 analyzes the telemetry data to determine whether the vehicle 102 requires service. For example, the fleet management server 104 may determine that a piston in the engine of one of the vehicles 102 is misfiring based on diagnostic information originating from a crankshaft position sensor within the telemetry data of that vehicle 102, and that as a result, the engine of the vehicle 102 requires a service (e.g., replacement of a spark plug, etc.). Alternatively or additionally, in some examples, the fleet management 104 receives a request from one of the vehicles 102 for a service. For example, a vehicle 102 may send a notification indicative that the current range of the vehicle 102 is at or below a threshold range and request a refueling.

When the one of the vehicles 102 requires a service (YES at 404), the fleet management server 104 autonomously selects a vendor 106 to provide the service (406). Otherwise, when the vehicles 102 do not require a service (NO at block 404), the fleet management server 104 continues to track and monitor the vehicles 102. In some examples, the fleet management server 104 determines that a vehicle within the fleet needs a service, but may algorithmically deprioritize the service (e.g., via the M2M transaction platform 310, etc.) such that the service is delayed (e.g., the fleet management server 104 directs the particular vehicle 102 to a vendor 106 at a future point in time, etc.) or the service request is ignored. To identify a vendor 106, the fleet management server 104 may, for example, select from a ranked list of vendors that provide the service within a threshold geographic region of the vehicle 102. Based on the location of the vehicle 102, the fleet management server 104 directs the vehicle 102 to the vendor 106 (408). In some examples, the fleet management server 104 provides the coordinates of the vendor 106 to a navigation system of the vehicle 102, via network 120, to facilitate a driver navigating to the vendor 106. Alternatively, in examples where the vehicle 102 is autonomous or semi-autonomous, the fleet management server 104 provides the coordinates of the vendor 106, via the network 120, to an autonomy ECU to facilitate the vehicle 102 autonomously navigating to the vendor 106. The fleet management server 104 validates the request for service and authorizes payment (410). In some examples, the fleet management server 104 validates the request for service in response to a request originating from the vehicle 102. In some such examples, the fleet management server 104 may also preauthorize a transaction such that the vehicle 102 may complete the transaction without further action by the fleet management server 104. In some examples, the fleet management server 104 validates the request for service in response to a request originating from POS device 122 of the vendor 106. In some such examples, the fleet management server 104 may authorize a transaction in response to a request by the POS device 122 of the vendor 106 indicative that the vehicle 102 has requested a service.

Figure 5:
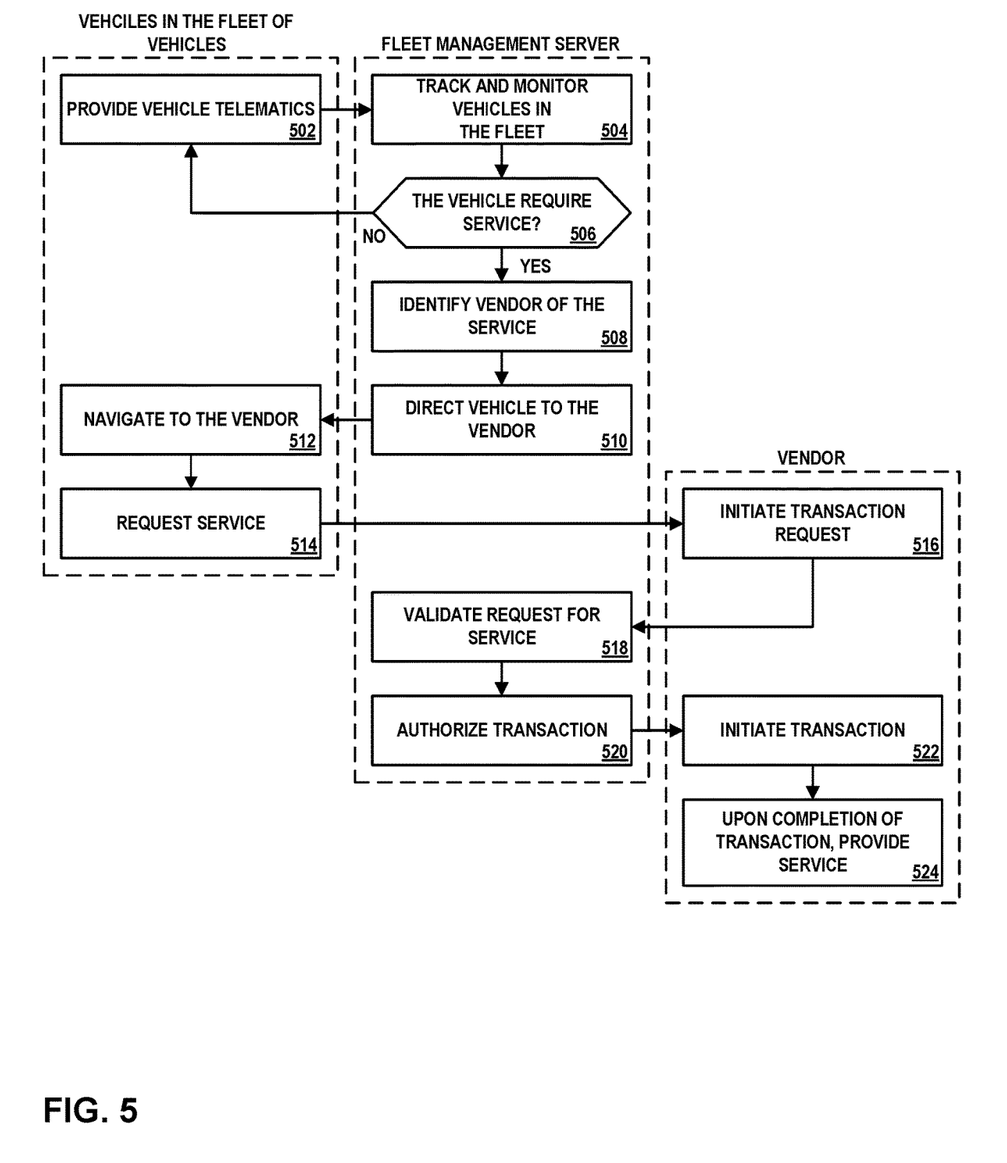
FIG. 5 is a flowchart of an example method to procure services for a fleet of vehicles.

FIG. 5 is a flowchart of an example method to procure services for a fleet of vehicles. Initially, the vehicle 102 provides vehicle telematic data to the fleet management server 104 (502). The fleet management server 104 tracks and monitors vehicles in the fleet (504). In some examples, to monitor the vehicles 102, the fleet management server 104 may, periodically (e.g., hourly, daily, etc.) aperiodically (e.g., in response to an event, etc.), apply the telemetry data to rules and/or policies that specify when a vehicle requires one or more services. The fleet management server 104 determines whether a vehicle 102 in the fleet requires a service (506). In some example, the fleet management server 104 analyzes the telemetry data to determine whether the vehicle 102 requires service. For example, the fleet management server 104 may determine that a piston in the engine of the vehicle 102 is misfiring based on diagnostic information originating from a crankshaft position sensor within the telemetry data and that as a result, the engine of the vehicle 102 requires a service (e.g., replacement of a spark plug, etc.).

In response to determining that one of the vehicles 102 requires a service (YES at 506), the fleet management server 104 identifies a vendor 106 to provide the service (508). Otherwise, when the vehicles 102 do not require a service (NO at block 506), the fleet management server 104 continues to track and monitor the vehicles 102. To identify a vendor 106, the fleet management server 104 may, for example, select from a ranked list of vendors that provide the service within a threshold geographic region of the vehicle 102. Based on the location of the vehicle 102, the fleet management server 104 directs the vehicle 102 to the vendor 106 (510). In some examples, the fleet management server 104 provides the coordinates of the vendor 106 to a navigation system of the vehicle 102 to facilitate a driver navigating to the vendor 106. Alternatively, in examples where the vehicle 102 is autonomous or semi-autonomous, the fleet management server 104 provides the coordinates of the vendor 106 to an autonomy ECU to facilitate the vehicle 102 autonomously navigating to the vendor 106.

The vehicle 102 navigates (e.g., anonymously or manually, etc.) to the selected vendor (512). When the vehicle 102 arrives at the vendor 106, the vehicle 102 establishes a connection with the POS device 122 of the vendor 106 (e.g., via the on-board communications platform 116, etc.) to request the service identified by the fleet management server 104 (514). In response to receiving the request for a service, the vendor (e.g., via the POS device 122) initiates a transaction request for the service (516).

In the illustrated example, the fleet management server 104 validates the request for service when, for example, the vendor identifier, the vehicle identifier and the service identifier match expected values (518). For example, when the fleet management server 104 identifies the required service and the selected vendor, the fleet management server 104 may create a service record that includes the vendor identifier, the vehicle identifier and the service identifier to use to validate a service request. The fleet management server 104 authorizes the transaction (520). The vendor 106 initiates the authorized transaction (e.g., via the transaction gateway 108) (522). Upon completion of the transaction, the vendor 106 provides the requested service (524).

Figure 6:
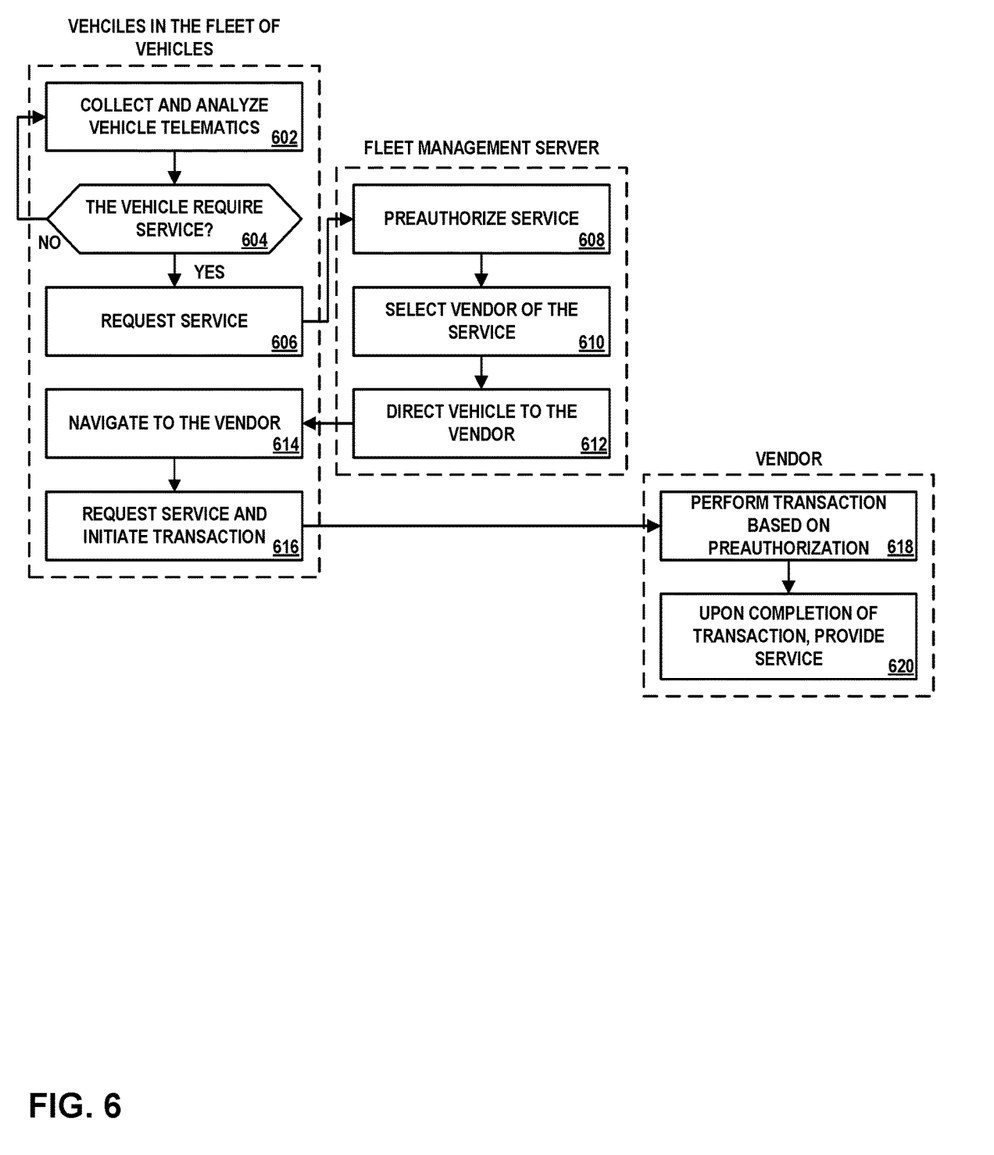
FIG. 6 is a flowchart of an example method to manage a preauthorized transaction by a vehicle.

FIG. 6 is a flowchart of an example to manage a preauthorized transaction by a vehicle 102. Initially, the vehicle 102 collects and analyzes vehicle telematic data (e.g., via the telemetry module 114, etc.) (602). From time-to-time, the vehicle 102 determines whether a service is required (604). In some examples, the vehicle 102 applies rules and/or policies that specify when a vehicle requires one or more services to the vehicle telemetry data. In some such examples, the vehicle 102 receives the rules and/or policies from the fleet management server 104. When the vehicle 102 determines that service is required (YES at 604), the vehicle 102 requests the service from the fleet management server 104 (606). When the vehicle 102 determines that service is not required (NO at 604), the vehicle 102 continues to collect and analyze vehicle telematics data (602).

The fleet management server 104 then preauthorizes the service (608). In some examples, to preauthorize the service, the fleet management server 104 provides permission to use account information stored in memory of the vehicle 102 (e.g., in the on-board transaction module 118) or provides a one-time use token to use to perform the transaction. The fleet management server 104 selects a vendor for the requested service (610). The fleet management server 104 directs the vehicle 102 to the selected vendor 106 (612).

The vehicle 102 navigates to the location of the vendor 106 (614). The vehicle 102 requests the service and initiates a transaction for the service (616). The vendor 106 (e.g., via the POS device 122) performs the transaction based on the preauthorization (618) (e.g., via the transaction gateway 108, etc.). For example, the vendor 106 may perform the transaction using the account information stored in the memory of the vehicle 102 or use the one-time use token. Upon completion of the transaction, the vendor 106 provides the requested service (620).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method for controlling autonomous vehicles, comprising:
    determining, by a server configured to manage multiple vehicles in a fleet of autonomous vehicles, to provision a service for a vehicle in the fleet of autonomous vehicles based on telemetry data received from a telemetry module on the vehicle, the telemetry data including a first location of the vehicle and status information of the vehicle that is indicative of the vehicle's need for one or more services;
    identifying, by the server, a vendor from a list of authorized vendors to provide the service to the vehicle based at least on the first location of the vehicle and a second location of the vendor;
    directing, by the server, the vehicle to the second location of the vendor from the first location of the vehicle, wherein directing the vehicle to the second location of the vendor further comprises transmitting, over a network, one or more navigational data packets to the vehicle providing instructions for the vehicle to autonomously navigate to the second location; and
    providing, by the server and to the vehicle, authorization for an on-board transaction module on the vehicle to initiate a financial transaction request with a point-of-sale device of the vendor for the service to be provided to the vehicle by the vendor when the vehicle is at the second location of the vendor, wherein the authorization to initiate the financial transaction comprises one of permission to use account information stored in the on-board transaction module or a one-time use token provided by the server and to the on-board transaction module, and wherein the point-of-sale device of the vendor uses one of the account information or the one-time use token to complete the financial transaction with a transaction gateway.

2. The method of claim 1, wherein determining to provision the service for the vehicle further comprises analyzing the telemetry data based on rules to determine whether the service of the one or more services is required by the vehicle.

3. The method of claim 1, wherein determining to provision the service for the vehicle further comprises receiving a request for the service from the vehicle, the request based on the telemetry data.

4. The method of claim 1, wherein providing the permission to use the account information to initiate the financial transaction request for the service includes providing, by the server and to the vehicle, a key value that unlocks the account information stored in the on-board transaction module on the vehicle to initiate the financial transaction request with the point-of-sale device of the vendor.

5. The method of claim 1, further comprising:
    receiving, by the server and from the point-of-sale device of the vendor, a validation request for the financial transaction request initiated by the on-board transaction module on the vehicle with the point-of-sale device for the service to be provided to the vehicle by the vendor; and
    in response to receiving the validation request from the point-of-sale device of the vendor, authorizing, by the server, the transaction gateway to complete the financial transaction initiated by the on-board transaction module on the vehicle with the point-of-sale device of the vendor for the service to be provided to the vehicle by the vendor.

6. A fleet management server for controlling autonomous vehicles, the server configured to manage multiple vehicles in a fleet of autonomous vehicles, the server comprising:
    a memory; and
    one or more processors in communication with the memory and configured to:
        determine to provision a service for a vehicle in the fleet of autonomous vehicles based on telemetry data received from a telemetry module on the vehicle, the telemetry data including a first location of the vehicle and status information of the vehicle that is indicative of the vehicle's need for one or more services;
        identify a vendor from a list of authorized vendors to provide the service to the vehicle based at least on the first location of the vehicle and a second location of the vendor;
        direct the vehicle to the second location of the vendor from the first location of the vehicle, wherein to direct the vehicle to the second location of the vendor, the one or more processors are configured to transmit, over a network interface, one or more navigational data packets to the vehicle to provide instructions for the vehicle to autonomously navigate to the second location; and
        provide, to the vehicle, authorization for an on-board transaction module on the vehicle to initiate a financial transaction request with a point-of-sale device of the vendor for the service to be provided to the vehicle by the vendor when the vehicle is at the second location of the vendor, wherein the authorization to initiate the financial transaction comprises one of permission to use account information stored in the on-board transaction module or a one-time use token provided by the server and to the on-board transaction module, and wherein the point-of-sale device of the vendor uses one of the account information or the one-time use token to complete the financial transaction with a transaction gateway.

7. The server of claim 6, wherein to determine to provision the service for the vehicle, the one or more processors are configured to analyze the telemetry data based on rules that determine whether the service of the one or more services is required by the vehicle.

8. The server of claim 6, wherein to determine to provision the service for the vehicle, the one or more processors are configured to determine to provision the service in response a request for the service from the vehicle, the request based on the telemetry data.

9. The server of claim 6, wherein to provide the permission to use the account information to initiate the financial transaction request, the one or more processors are configured to provide, to the vehicle, a key value that unlocks the account information stored in the on-board transaction module on the vehicle to initiate the financial transaction request with the point-of-sale device of the vendor.

10. The server of claim 6, wherein the one or more processors are configured to:
 receive, from the point-of-sale device of the vendor, a validation request for the financial transaction request initiated by the on-board transaction module on the vehicle with the point-of-sale device for the service to be provided to the vehicle by the vendor; and
 in response to receiving the validation request from the point-of-sale device of the vendor, authorize the transaction gateway to complete the financial transaction initiated by the on-board transaction module on the vehicle with the point-of-sale device of the vendor for the service to be provided to the vehicle by the vendor.

11. A non-transitory computer readable medium comprising instructions for controlling autonomous vehicles, the instructions, when executed, cause one or more processors of a fleet management server configured to manage multiple vehicles in a fleet of autonomous vehicles to:
 determine to provision a service for a vehicle in the fleet of autonomous vehicles based on telemetry data received from a telemetry module on the vehicle, the telemetry data including a first location of the vehicle and status information of the vehicle that is indicative of the vehicle's need for one or more services;
 identify a vendor from a list of authorized vendors to provide the service to the vehicle based at least on the first location of the vehicle and a second location of the vendor;
 direct the vehicle to the second location of the vendor from the first location of the vehicle, wherein to direct the vehicle to the second location of the vendor, the instructions cause the one or more processors to transmit, over a network interface, one or more navigational data packets to the vehicle to provide instructions for the vehicle to autonomously navigate to the second location; and provide, to the vehicle, authorization for an on-board transaction module on the vehicle to initiate a financial transaction request with a point-of-sale device of the vendor for the service to be provided to the vehicle by the vendor when the vehicle is at the second location of the vendor, wherein the authorization to initiate the financial transaction comprises one of permission to use account information stored in the on-board transaction module or a one-time use token provided by the server and to the on-board transaction module, and wherein the point-of-sale device of the vendor uses one of the account information or the one-time use token to complete the financial transaction with a transaction gateway.

12. The computer readable medium of claim 11, wherein to determine to provision the service for the vehicle, the instructions further cause the one or more processors to analyze the telemetry data based on rules to determine whether the service of the one or more services is required by the vehicle.

13. The computer readable medium of claim 11, wherein to determine to provision the service for the vehicle, the instructions further cause the one or more processors to receive a request for the service from the vehicle, the request based on the telemetry data.

14. The computer readable medium of claim 11, wherein the instructions further cause the one or more processors to:
 receive, from the point-of-sale device of the vendor, a validation request for the financial transaction request initiated by the on-board transaction module on the vehicle with the point-of-sale device for the service to be provided to the vehicle by the vendor; and
 in response to receiving the validation request from the point-of-sale device of the vendor, authorize the transaction gateway to complete the financial transaction initiated by the on-board transaction module on the vehicle with the point-of-sale device of the vendor for the service to be provided to the vehicle by the vendor.

15. The computer readable medium of claim 11, wherein to provide the permission to use the account information to initiate the financial transaction request, the instructions further cause the one or more processors to provide, to the vehicle, a key value that unlocks the account information stored in the on-board transaction module on the vehicle to initiate the financial transaction request with the point-of-sale device of the vendor.

\* \* \* \* \*